United States Patent [19]

Iwama

[11] Patent Number: 4,658,407
[45] Date of Patent: Apr. 14, 1987

[54] ELECTRONIC CLINICAL THERMOMETER WITH POWER SHUT-OFF AT MAXIMUM TEMPERATURE

[75] Inventor: Nobuyuki Iwama, Tokyo, Japan

[73] Assignee: Kabushiki Kaisha Toshiba, Kawasaki, Japan

[21] Appl. No.: 684,138

[22] Filed: Dec. 20, 1984

[30] Foreign Application Priority Data

Dec. 21, 1983 [JP] Japan ................. 58-239800

[51] Int. Cl.⁴ ............................................. G01K 7/16
[52] U.S. Cl. ........................................ 377/25; 364/557; 374/170; 73/183
[58] Field of Search .............. 377/25; 364/557; 374/170; 73/170, 183, 185

[56] References Cited

U.S. PATENT DOCUMENTS

| 3,872,728 | 3/1975 | Joyce et al. | 377/25 |
| 4,031,365 | 6/1977 | Raggiotti et al. | 377/25 |
| 4,090,064 | 5/1978 | Turner | 377/25 |
| 4,150,573 | 4/1979 | Iinuma et al. | 377/25 |
| 4,195,349 | 3/1980 | Balkanli | 377/25 |
| 4,206,649 | 6/1980 | Nagaie | 374/170 |
| 4,551,031 | 11/1985 | Ishikawa et al. | 377/25 |

FOREIGN PATENT DOCUMENTS

| 15105 | 6/1976 | Australia . |
| 22061 | 7/1981 | European Pat. Off. . |
| 2848112 | 5/1980 | Fed. Rep. of Germany . |

Primary Examiner—John S. Heyman
Assistant Examiner—Karl Ohralik
Attorney, Agent, or Firm—Schwartz, Jeffery, Schwaab, Mack, Blumenthal & Evans

[57] ABSTRACT

The electronic clinical thermometer in accordance with the present invention comprises a thermometric oscillator for converting a variation in the temperature sensitive resistance to a frequency corresponding to the temperature, a thermometric counter for counting the oscillation frequency of the thermometric oscillator to convert the frequency to a temperature value, a maximum value memory circuit for detecting the maximum value by comparing in succession the content of the thermometric counter, a display circuit for digitally displaying the content of the maximum value memory circuit, and a controlling circuit for controlling the thermometric oscillator so as to discontinue the oscillation of the thermometric oscillator at a prescribed time after the beginning of temperature detection or detection of a maximum value.

5 Claims, 7 Drawing Figures

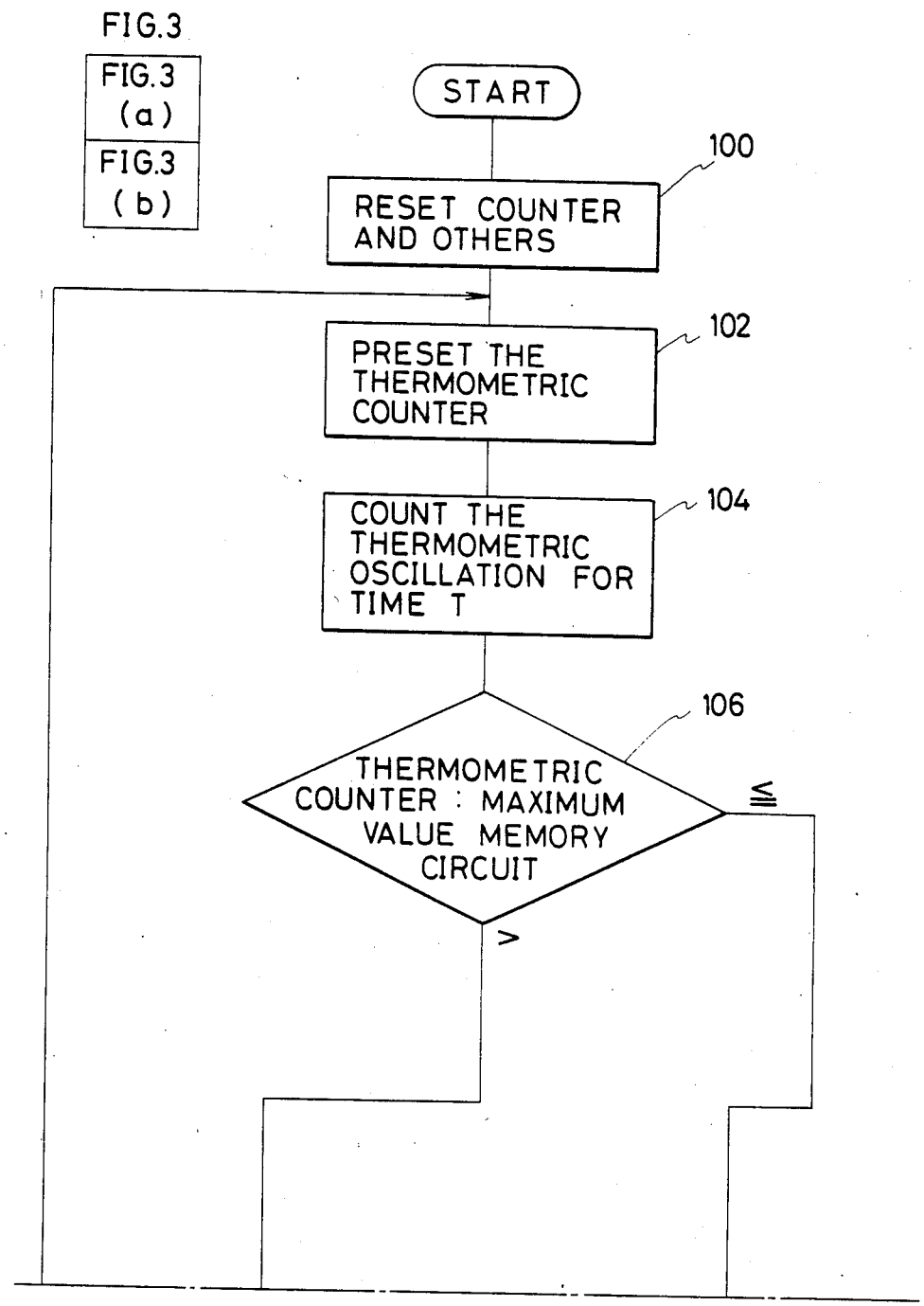

ELECTRONIC CLINICAL THERMOMETER WITH POWER SHUT-OFF AT MAXIMUM TEMPERATURE

BACKGROUND OF THE INVENTION

1. Field of the Invention

The present invention relates to an electronic clinical thermometer for detecting temperature by arranging a temperature sensitive resistor within a thermometric oscillator circuit and counting the oscillation frequency, and in particular, to an electronic thermometer adapted to reducing power consumption.

2. Description of the Prior Art

A prior art electronic clinical thermometer in general use is equipped with a sliding switch for controlling the turning on and off of the power source, and the power is shut off by operating the sliding switch after the detection of temperature. However, operating such a sliding switch is troublsome, and power is often wasted due to the operator forgetting to turn off the power.

Moreover, a temperature sensitive resistor is installed in the circuit of a thermometric oscillator whose oscillation frequency varies with temperature. The resistance of the resistor is small so that a large current flows through the resistor, consuming large power. Accordingly, the wasted amount of power due to keeping the power in the on-state during the period for which no operation is needed, has been largely responsible for determining the life of the battery. Further, the electronic clinical thermometer in general used is mainly used under the emergency condition in which somebody in the family is having a fever. In that condition, there exists a possibility of finding it inoperative during such an emergency because of the dead battery due to the last user forgetting to turn off the switch. Moreover, in the case of use in a hospital, if the power consumption is large, there is a high possibility of having a dead battery due to high frequency of use.

In order to avoid the dead battery situation due to power exhaustion, there has been proposed a thermometer in which a switching transistor for controlling the turning on and off of the power source is installed in the LSI for the clinical thermometer and so arranged as to have the power source to be turned off automatically after elapse of a prescribed time (for example, the times for detecting and displaying the temperature) to eliminate the possiblity of forgetting to turn off the switch.

However, the switching transistor for controlling the turning on and off of the power source is disadvantageous because it occupies a large area on the LSI chip, thus defeating attempts to make a small-size and low-price LSI.

In addition, in the case where the time for reading out the temperature display is uncertain, like in the hospital, the time interval between initiating taking of temperature in the room and the nurse coming to record the measured temperature is relatively large. Under these circumstances, it is difficult to shorter the time between turning the power source on to shutting the power source off automatically, because of the possible of having the power source turned off before the temperature display is read out. Therefore, many electronic clinical thermometer are utilized without the function of automatically shutting off the power source, and hence, the only method for reducing the power consumption is to turn off the power switch consciously at time right after readout.

SUMMARY OF THE INVENTION

An object of the present invention is to provide an electronic clinical thermometer which is capable of reducing power consumption.

Another object of the present invention is to provide an electronic clinical thermometer which is capable of extending the life of the battery used.

Another object of the present invention is to provide an electronic clinical thermometer which is capable of displaying the body temperature over a long period while providing a lower consumption of power.

Briefly described, these and other objects of the present invention are accomplished by the provision of an improved electronic clinical thermometer which includes a thermometric oscillator for converting a variation of the resistance in the temperature sensitive resistor caused by the temperature to a frequency corresponding to the temperature, a thermometric counter for converting the oscillation frequency of the thermometric oscillator to a temperature value, a maximum value memory circuit for detecting the maximum value of the temperature by comparing successively the content of the thermometric counter, a display circuit for digitally displaying the content of the maximum value memory circuit, and means for discontinuing the oscillation of the thermometric oscillator at a prescribed time after detection of the maximum value of the temperature or detection of the maximum temperature value.

BRIEF DESCRIPTION OF THE DRAWING

These and other objects, features and advantages of the present invention will be more apparent from the following description of a preferred embodiment taken in conjunction with the accompanying drawings in which.

DESCRIPTION OF THE PREFERRED EMBODIMENTS

Figure 1:
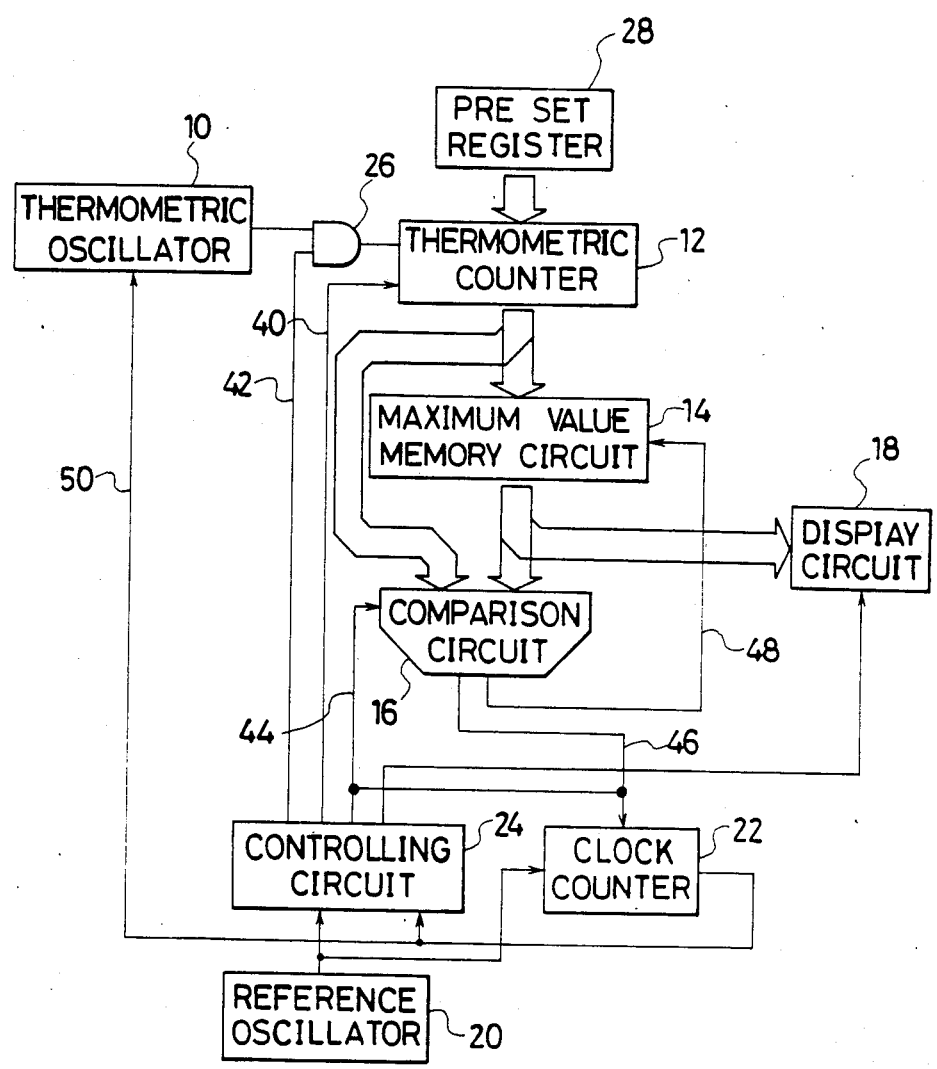
FIG. 1 is a block diagram showing the circuit construction of an electronic clinical thermometer embodying the present invention.

Referring to FIG. 1, there is shown the circuit construction of an electronic clinical thermometer embodying the present invention.

The electronic clinical thermometer of FIG. 1 includes a thermometric oscillator 10 whose oscillation frequency varies in response to the temperature, a thermometric counter 12 for counting the oscillation frequency of the thermometric oscillator 10 and converting it to the temperature, a maximum value memory circuit 14 for memorizing the maximum temperature value, a comparison circuit 16 for comparing the value from the thermometric counter 12 and the value in the maximum value memory circuit 14 and when the value from the thermometric counter 12 is the larger, the value of the thermometric counter is latched into the maximum value memory circuit 14 as a new maximum value, a display circuit 18 for displaying the value of the maximum value memory circuit 14, and a reference oscillator 20 for outputting the reference clock. Furthermore, the thermometer includes a clock counter 22 for counting the oscillations of the reference oscillator 20 and for outputting an overflow signal to discontinue the oscillation of the thermometric oscillator 10 after a prescribed time, and a controlling circuit 24 for controlling the comparison circuit 16 to output a reset signal to the clock counter 22 in case the maximum value is not detected.

In addition, a gate 26 which is controlled by the controlling circuit 24 is arranged between the thermometric oscillator 10 and the thermometric counter 12, and a preset register 28 is connected to the thermometric counter 12.

Figure 2:
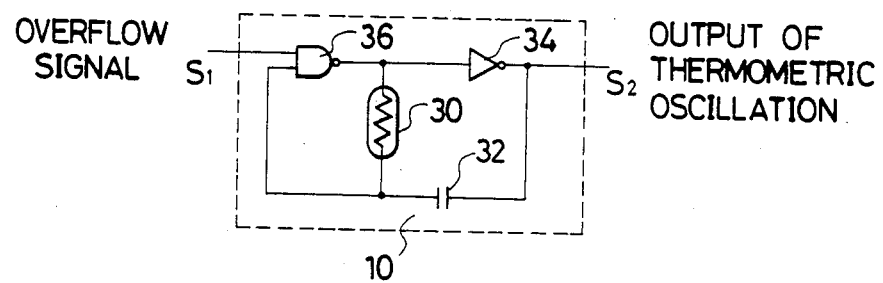
FIG. 2 is a circuit diagram of the oscillation circuit shown in FIG. 1.
Figure 4A:
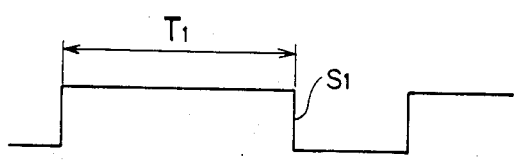
FIGS. 4a and 4b are the time charts illustrating the operation of the oscillation circuit for measurement shown in FIG. 2.
Figure 4B:
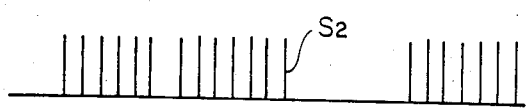

The thermometric oscillator 10 is constructed, as shown in FIG. 2, from a temperature sensitive resistor 30 comprising a linear thermistor whose resistance varies in proportion to the temperature, a capacitor 32, an inverter 34, and a NAND gate 36. When a signal from the clock counter 22 is inputted to the NAND gate 36 for a fixed time interval T1, as shown in FIG. 4a, the thermometric oscillator 10 begins to oscillate to produce an output pulse S2 at the leading edge of the measurement command pulse S1, as shown in FIG. 4b, and discontinues oscillation of the output pulse S2 at the trailing edge of the measurement command pulse S1. Since the frequency of the output pulse S2 of the thermometric oscillator 10 is proportional to the temperature, calibration is made beforehand so as to accommodate the number of output pulses S2 corresponding to the temperature within the interval T1 of the measurement command pulse. By such an arrangement, it becomes possible to convert the count of the output pulses S2 to the temperature by the use of the thermometric counter 12.

Figure 3:
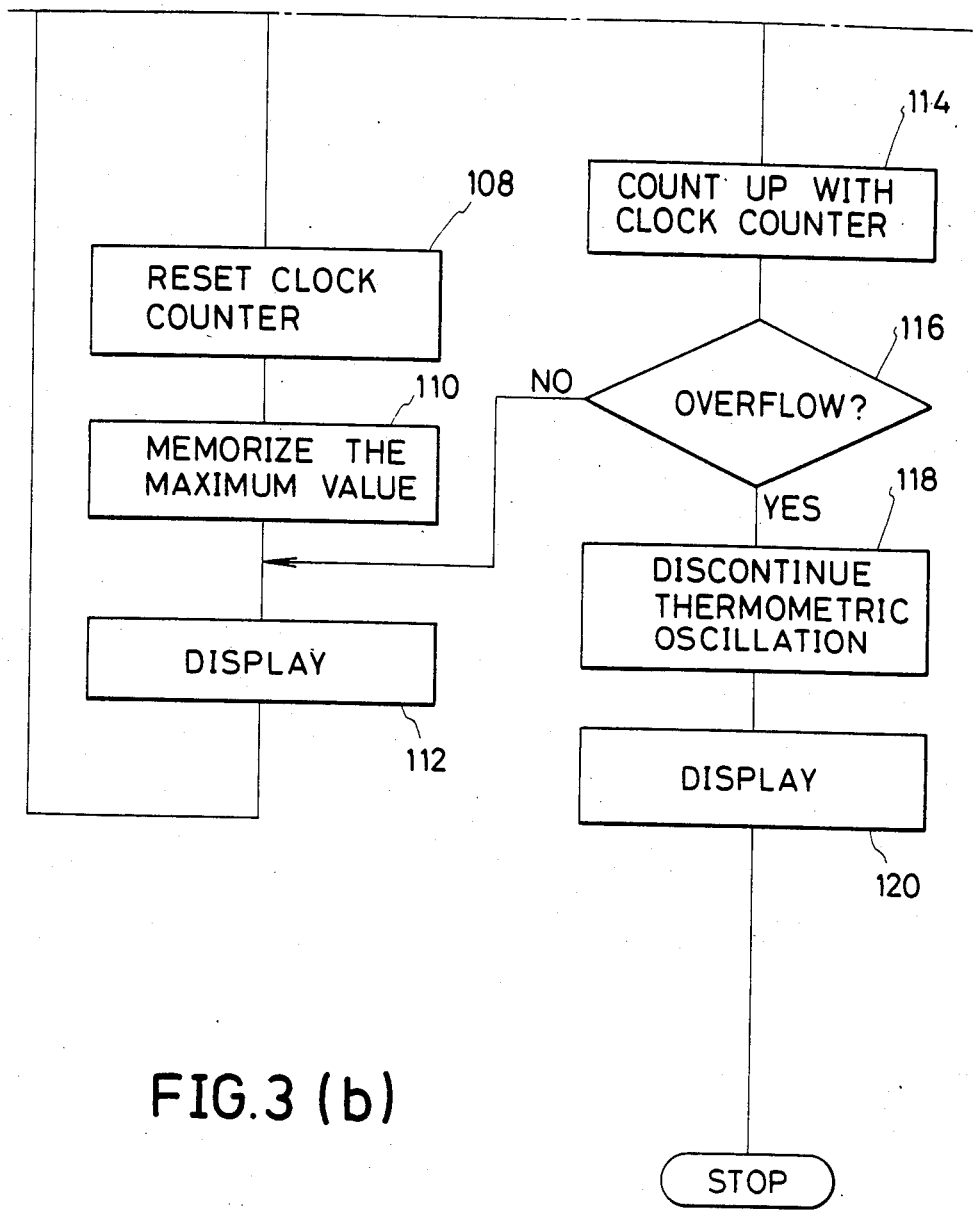
FIG. 3 is a flow chart illustrating the operation of the embodiment shown in FIG. 1.

Next, referring to FIG. 3, the operation of the electronic clinical thermometer shown in FIG. 1 will be discribed.

First, in step 100, the thermometric counter 12 and the clock counter 22 are reset by a reset signal from the controlling circuit 24. Then, the thermometric counter 12 presets the initial value from the preset register 28, in accordance with a first control signal 40 from the controlling circuit 24 created by the output of the reference oscillator (step 102). Next, the gate 26 is opened by a second control signal 42 from the controlling circuit 24, to let the thermometric counter 12 count for a time t the oscillations which are linear relative to the temperature from the thermometric oscillator 10 (step 104).

After the time t, the gate 26 is closed by the second control signal 42, and the thermometric counter 12 discontinues counting the oscillations of the thermometric oscillator 10, and the comparison circuit 16 compares, in response to a third control signal 44 from the controlling circuit 24, the content of the thermometric counter 12 and the content of the maximum value memory circuit 14 (step 106). If the result of the comparison shows that the content of the thermometric counter 12 is larger than the content of the maximum value memory circuit 14, the comparison circuit 16 generates a reset signal along line 46 to reset the clock counter 22 which has been counting the oscillations of the reference oscillator 20 (step 108). With a latch signal 48, the comparison circuit 16 latches the content of the thermometric counter 12 into the maximum value memory circuit 14 as a new maximum value (step 110). Next, the display circuit 18 displays digitally the content of the maximum value memory circuit 14 as a temperature value (step 112). If, in step 106, the content of the thermometric counter 12 becomes smaller than the content of the maximum value memory circuit 14, the comparison circuit 16 creates neither a latch signal 48 for latching the content of the thermometric counter 12 into the maximum value memory circuit 14 nor a reset signal 46 for resetting the clock counter 22. If such periods continue, the content of the clock counter 22 continues to be counted up without being reset (step 114). In step 116, when an overflow takes place after a prescribed time, oscillation of the thermometric oscillator 10 is discontinued by the overflow signal 50 from the clock counter 22, thereby interrupting the current flowing to the temperature sensitive resistor 30 (step 118). Thereafter, only the display will occur without oscillation of the thermometric oscillator 10 (step 120). In this stage, it is possible to reduce the power consumption of the electronic clinical thermometer as a whole since the thermometric oscillator 10 is not working and power is consumed for the operation of only the reference oscillator 20 and the display circuit 18. In step 116, if no overflow occurs after a prescribed time, it proceeds to step 112 to digitally display the maximum value, and returns from step 112 to step 102 to preset the thermometric counter 12.

Figure 5:
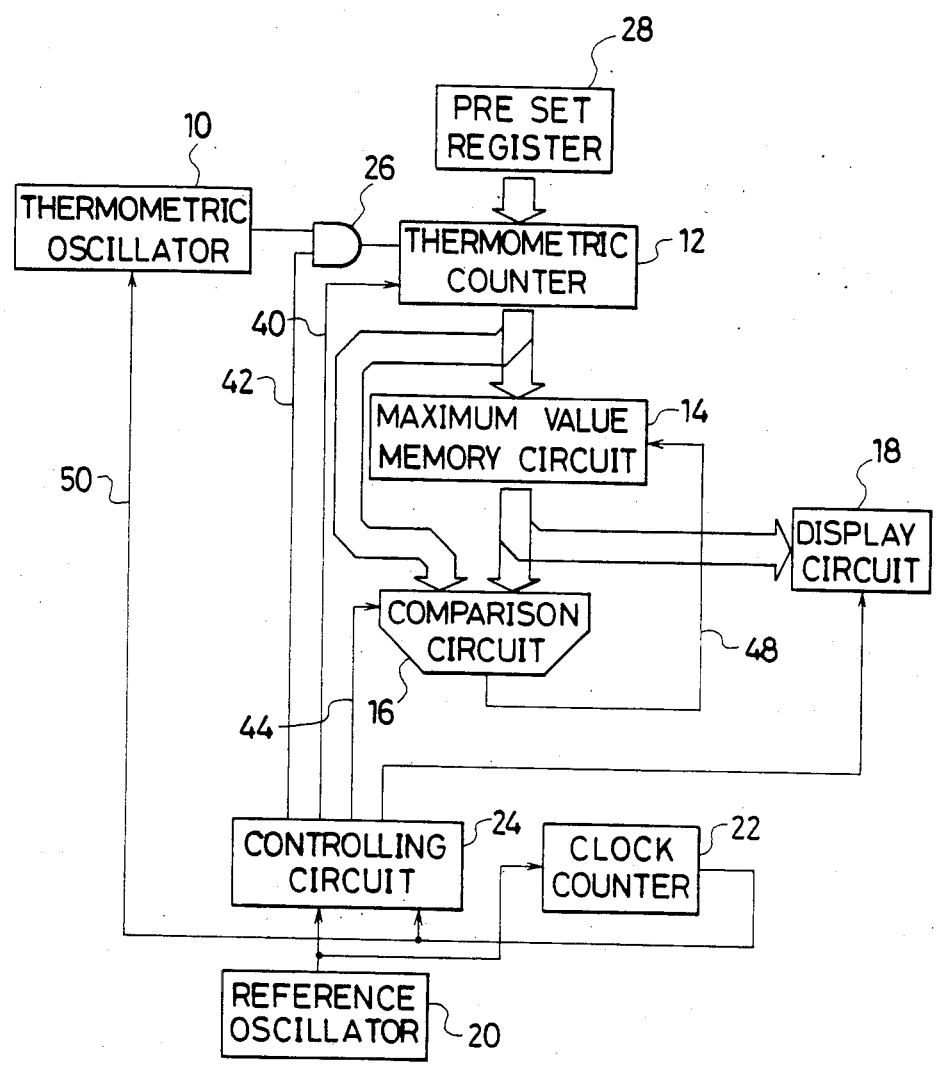
FIG. 5 is a block diagram for illustrating the circuit construction of another embodiment of the electronic clinical thermometer in accordance with the present invention.

Next, referring to FIG. 5, description will be made of a second embodiment which accomplishes the discountinuation of the thermometric oscillation at a prescribed time after the turn-on of the power source.

In the second embodiment, identical symbols will be used to designate the identical parts as in the embodiment shown in FIG. 1. The second embodiment differs from the first embodiment, though basically the same, in that it is constructed to begin the counting of the oscillations of the reference oscillator from the moment of turning the power source on, and to discontinue the operation of the thermometric oscillator 10 by causing an overflow after a prescribed time.

Therefore, by such a construction, it is possible to discontinue the oscillation of the thermometric oscillator 10 after elapse of a prescribed time corresponding to the time interval between the beginning of temperature detection and the reading-out of the temperature, achieving a reduction in the power consumption as in the first embodiment.

Although a thermometric oscillator circuit with thermistor was used in the foregoing embodiments, the present invention is not limited to the use of this circuit, and it may be replaced by any other oscillator circuit as long as the oscillation frequency varies with temperature and permits on and off control of the oscillation.

Furthermore, the clock generating circuit too need not be limited to the CR oscillator, and, like in the above, any other oscillator circuit with on-off oscillation control may be utilized.

Various modifications will become possible for those skilled in the art in view the teachings of the present disclosure without departing from the scope thereof.

What is claimed is:

1. An electronic clinical thermometer comprising:
   (a) a thermometric oscillator means for producing output pulses having an oscillation frequency which varies in accordance with a temperature desired to be measured;

(b) a thermometric counter means connected to said thermometric oscillator means for counting said output pulses, the frequency of said output pulses proportional to the temperature to be measured;

(c) a maximum value memory circuit means connected to said thermometric counter means for storing a maximum count value of said counter means corresponding to a maximum temperature;

(d) a comparison circuit means for comparing the maximum count value stored in the maximum value memory circuit means with the count value from the thermometric counter means and for producing a reset signal when said thermometer counter count value is greater than said maximum count value;

(e) a reference oscillator generating a plurality of reference pulses;

(f) a clock counter means connected to said reference oscillator for counting clock pulses from said reference oscillator and connected to receive said reset signal for resetting the count of said clock pulses, said clock counter producing an overflow signal when no reset signal is received after a predetermined time from said comparison circuit; and (g) said thermometric oscillator responsive to said overflow signal from said clock counter means for inhibiting production of said output pulses from said thermometric oscillator means, whereby energy is conserved by terminating production of said thermometric oscillator output pulses when said maximum temperature is stored in said maximum value memory circuit means.

2. An electronic clinical thermometer as claimed in claim 1, wherein said comparison circuit means produces said reset signal to said clock counter means so as to reset the clock counter means whether or not the count value of said thermometric counter means is greater than the maximum value stored in the maximum value memory circuit means.

3. An electronic clinical thermometer as claimed in claim 2, wherein said maximum value memory circuit means is responsive to said reset signal to update the contents of the maximum value memory circuit means by storing therein the count value of said thermometric counter means.

4. An electronic clinical thermometer as claimed in claim 1, further comprising a display means connected to said maximum value memory circuit means for displaying said maximum count value as said maximum temperature.

5. An electronic clinical thermometer comprising:
(a) a thermometric oscillator means for producing output pulses having an oscillation frequency which varies in accordance with a temperature desired to be measured;

(b) a thermometric counter means connected to said thermometric oscillator means for counting said output pulses, the frequency of said output pulses proportional to the temperature to be measured;

(c) a maximum value memory circuit means connected to said thermometric counter means for storing a maximum count value of said counter means corresponding to a maximum temperature;

(d) a comparison circuit means for comparing the maximum count value stored in the maximum value memory circuit means with the count value from the thermometric counter means and for producing a reset signal when said thermometric count count value is greater than said maximum count value;

(e) a reference oscillator generating a plurality of reference pulses;

(f) a clock counter means connected to said reference oscillator for counting clock pulses from said reference oscillator and producing an overflow signal after a predetermined time after power-up of said thermometer; and (g) said thermometric oscillator responsive to said overflow signal from said clock counter means for inhibiting production of said output pulses from said thermometric oscillator means, whereby energy is conserved by terminating production of said thermometric oscillator output pulses.

* * * * *